(12) United States Patent
Zhuang et al.

(10) Patent No.: US 7,928,390 B1
(45) Date of Patent: Apr. 19, 2011

(54) INFRARED METROLOGY

(75) Inventors: Guorong V. Zhuang, Santa Clara, CA (US); John Fielden, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 387 days.

(21) Appl. No.: 12/193,361

(22) Filed: Aug. 18, 2008

Related U.S. Application Data

(60) Provisional application No. 60/970,408, filed on Sep. 6, 2007.

(51) Int. Cl.
*G01J 5/02* (2006.01)
(52) U.S. Cl. ................................. 250/339.08
(58) Field of Classification Search ........ 250/339.01–339.15; 385/122, 385/332
See application file for complete search history.

(56) References Cited

U.S. PATENT DOCUMENTS

| | | | |
|---|---|---|---|
| 5,485,271 A | | 1/1996 | Drevillon et al. |
| 5,706,212 A | | 1/1998 | Thompson et al. |
| 5,956,147 A | * | 9/1999 | Jellison et al. ............... 356/369 |
| 6,008,931 A | * | 12/1999 | von Helmolt et al. ........ 359/326 |
| 6,175,412 B1 | * | 1/2001 | Drevillon et al. ............ 356/369 |
| 6,819,423 B2 | | 11/2004 | Stehle et al. |
| 7,133,590 B2 | | 11/2006 | Shaw et al. |
| 7,403,293 B2 | | 7/2008 | Pellemans et al. |
| 7,410,815 B2 | | 8/2008 | Vagos |
| 2005/0111805 A1 | * | 5/2005 | Hertz et al. ................... 385/125 |
| 2005/0134849 A1 | * | 6/2005 | Beaglehole .................. 356/369 |
| 2007/0002336 A1 | | 1/2007 | Pellemans et al. |
| 2007/0139646 A1 | * | 6/2007 | Singh .......................... 356/237.2 |
| 2009/0244516 A1 | * | 10/2009 | Mehendale et al. ........... 356/33 |
| 2010/0108886 A1 | * | 5/2010 | Shaw et al. .............. 250/339.08 |

OTHER PUBLICATIONS

Nisoli et al., "Ultra-broadband continuum generation by hollow-fiber cascading," 2002, Applied Physics B, vol. 75, pp. 601-604.*
Kim et al., "Coherent control of terahertz supercontinuum generation in ultrafast laser=gas interactions," Nature Photonics, Macmillan Publishers Limited, (Jul. 27, 2008).
Butvina et al., "Single- mode microstructured optical fiber for the middle infrared," Optics Letters, vol. 32, No. 4, pp. 334-336, (Feb. 15, 2007).
Shaw et al., "As-S and As-Se based photonic band gap fiber for IR laser transmission," Optics Express, vol. 11, No. 25, pp. 3455-3460, (Dec. 15, 2003).

* cited by examiner

*Primary Examiner* — David P Porta
*Assistant Examiner* — Kiho Kim
(74) *Attorney, Agent, or Firm* — Luedeka, Neely & Graham, P.C.

(57) ABSTRACT

A spectroscopic instrument of the type providing an infrared light beam from an infrared light source along an infrared light path, where the infrared light beam includes a wide range of wavelengths of radiation within a target range of from about two microns to about three hundred microns, where the infrared light source includes a supercontinuum source having a $CO_2$ pumping laser adapted to fire into a solid-core photonic crystal fiber formed at least in part of at least one of $AlCl_xBr_{(1-x)}$, NaCl, and ZnSe, which solid-core photonic crystal fiber produces the infrared light beam when excited by the pumping laser.

20 Claims, 3 Drawing Sheets

INFRARED METROLOGY

This application claims all rights and priority to U.S. provisional patent application Ser. No. 60/970,408 filed 2007, Sep. 6. This invention relates to the field of integrated circuits. More particularly, this invention relates to measuring properties of materials used in the fabrication of integrated circuits.

FIELD

Background

There is a great demand for bright infrared sources in the mid-infrared spectral range, generally defined as from about two microns to about twenty microns, for use in Fourier Transform Infrared reflectometry and Fourier Transform Infrared spectroscopic ellipsometry (generally referred to a reflectometry and ellipsometry herein), such as are used in integrated circuit metrology applications. Furthermore, for some applications it is desirable to extend the range of Fourier Transform Infrared reflectometry and ellipsometry to longer wavelengths, such as into the far-infrared and THz region. Specifically, 1 THz is equivalent to 300 microns in wavelength, and 33.3 cm$^{-1}$ in wavenumber. The frequency range of 5 THz to 80 THz corresponds to 3.75 microns to 60 microns in wavelength, and 167 cm$^{-1}$ to 2666 cm$^{-1}$ in wavenumber. Therefore, THz radiation covers the far-infrared spectral region and part of the mid-infrared region.

As the term is used herein, "integrated circuit" includes devices such as those formed on monolithic semiconducting substrates, such as those formed of group IV materials like silicon or germanium, or group III-V compounds like gallium arsenide, or group II-VI compounds, or mixtures of such materials. The term includes all types of devices formed, such as memory and logic, and all designs of such devices, such as MOS, bipolar, organic field-effect transistors, and charge coupled devices. It includes devices formed from carbon nanotubes and from graphene. The term also comprehends applications such as flat panel displays and solar cells.

There are several configurations known for ellipsometry, including: (a) a Michelson interferometer-based device using a globar source in combination with a rotating polarizer, a photoelastic modulator, and a polarizer-analyzer; (b) a generalized ellipsometer with a dual-photoelastic modulator using a monochromatic laser or a broadband light source coupled with a monochrometer and a photomultiplier tube, athermal detectors such as pyroelectric bolometers, a quantum detector such as mercury cadmium telluride, or any infrared charge couple device array detector, in which two photoelastic modulators are operating at different modulation frequencies; (c) a rotating compensator ellipsometer using a globar source and a Michelson interferometer; and (d) a high spatial resolution ellipsometer as in (c) above, with an additional blocking device to suppress the parasite rays from attaining the rear surface of the sample, as is relevant in semiconductor metrology applications.

The spectral wavelengths of interest for integrated circuit metrology-specific applications range from about two microns to about 300 microns (wave numbers of from about thirty-three reciprocal centimeters to about five thousand reciprocal centimeters). The applicability of both ellipsometry and reflectometry to those applications is generally reduced from what it possibly could be because of several technology hurdles. Among those, perhaps the first and the foremost hurdle is the absence of a broadband infrared radiation source that has a sufficient brightness.

Applications for infrared metrology in semiconductors include the measurement of the conductivity of metals and semiconductors, including inferring the activated dopant concentration in doped semiconductors. Another application includes measuring the thickness of an epitaxial semiconductor layer deposited on a semiconductor substrate by exploiting the differences in refractive index of the epitaxial layer and the substrate due, at least in part, to differing dopant concentrations in the epitaxial layer and the substrate. Yet other applications include measuring the composition of dielectric materials, including measuring the concentration of dopants and contaminants in materials such as borophosphosilicate glass, phosphosilicate glass, borosilicate glass, fluorosilicate glass, carbon-doped oxide, and silicon nitride. The concentrations of the dopant species may be measured as well as, for example, OH and CH$_3$ groups, hydrogen, and other atoms or molecules incorporated into the material.

In semiconductor materials, optical effects due to free carriers become more pronounced at longer wavelength. Such behavior can be approximately described by a Drude model. For example, the extinction coefficient k is proportional to carrier concentration, and increases roughly as $\lambda^3$, where $\lambda$ is the wavelength. The Drude model also approximately models the optical behavior of metal films. By extending the spectral region to the far infrared (THz frequencies), the carrier concentration in semiconductors and metals could be measured. The conductivity of the semiconductor or metal can be inferred from the carrier concentration. Furthermore, due to the greater penetration depth of the longer wavelengths in metals, it is advantageous to simultaneously measure metal film thickness and conductivity using radiation in the far-infrared spectral region. Metals that are frequently used in the semiconductor and related industries include copper, aluminum, titanium, tantalum, and tungsten. Copper is a very highly conductive metal. Refractory metals such as tantalum or tungsten have lower conductivity. It is therefore advantageous to have an infrared metrology instrument that uses a very wide range of wavelengths in order to have good sensitivity for highly conductive metals, low conductivity metals and doped semiconductors (which have lower conductivity than refractory metals).

Before now, the only conveniently available broadband source was a globar, which is a silicon carbide rod with a width of from about five to ten millimeters and a length of from about twenty to fifty millimeters, which is electrically heated to between about 1000° C. and 1650° C. When combined with a downstream variable interference filter, it emits radiation within a wavelength range of about four microns to about fifteen microns. Globars are used as thermal light sources for infrared spectroscopy because their spectral behavior corresponds approximately to that of a Planck radiator.

However, globar sources can not meet the demanding signal to noise ratio required for integrated circuit metrology, which is directly related to the brightness of the source, such as to condense a large number of photons into a diffraction limited focal spot. Reflectometry and ellipsometry are further hampered by a low extinction ratio of the infrared wire-grid polarizer (the extinction ratio in this wavelength range may be one or more orders of magnitudes lower than that in the ultraviolet to visible spectral range), and also by the data acquisition time that is imposed by the necessary synchronization to the frequency of any rotating component, such as a polarizer, analyzer, or waveplate, with the Michelson interferometer scanning speed.

Conventional infrared source generation through blackbody radiation is described by Planck's law:

$$\rho(v, T) = \frac{8\pi v^2}{c^3} * \frac{hv}{\exp(hv/kT) - 1}$$

Where h is Planck's constant, c is the speed of light in vacuum, $v$ is the frequency of the radiation, which relates to the wavelength by $v=c/\lambda$, and T is the absolute temperature of the blackbody in Kelvin. Several approaches have been taken in the past to increase the density of radiation emitted per unit frequency, $\rho(v, T)$.

For example, increasing the source temperature tends to generally increase the brightness and intensity of the emitted radiation, such as by increasing the operating temperature of an electrically temperature controlled blackbody infrared source from 1140° C. to 1250° C. However, one of the fundamental problems of blackbody radiation, in addition to the practical limitations of dissipating the additional heat that is generated and the reduction in globar lifetime at elevated temperatures, is that the spectral brightness distribution shifts further towards the shorter wavelengths as the source temperature increases. In other words, at a temperature of about 25° C., the blackbody exhibits a peak brightness per unit frequency at a wavelength of about seventeen microns, whereas the peak brightness for the same blackbody at 1650° C. occurs at about 2.7 microns. Therefore, the brightness of the blackbody at a wavelength of about twenty microns, for example, is not increased that much by elevating the temperature of the blackbody from 1140° C. to 1250° C.

As another example, it was claimed that a high brightness infrared supercontinuum source having a spectral range of from about two microns to about fourteen microns can be produced by firing a pulsed laser into a photonic crystal fiber made from chalcogenide glasses, such as glass containing a chalcogenide element (sulfur, selenium, or tellurium) as a substantial constituent. However, although this spectral range was claimed, this method is not practical beyond a wavelength of about nine microns, because the spectral attenuation of the material increases significantly.

What is needed, therefore, is a system that overcomes problems such as those described above, at least in part.

SUMMARY

The above and other needs are met by a spectroscopic instrument of the type providing an infrared light beam from an infrared light source along an infrared light path, where the infrared light beam includes substantially all wavelengths of radiation within a target range of from about two microns to about twenty microns, where the infrared light source includes a supercontinuum source having a $CO_2$ pumping laser adapted to fire into a solid-core photonic crystal fiber formed at least in part of at least one of $AlCl_xBr_{(1-x)}$, NaCl, and ZnSe, which solid-core photonic crystal fiber produces the infrared light beam when excited by the pumping laser.

In an alternate embodiment, the above and other needs are met by a spectroscopic instrument of the type providing an infrared light beam from an infrared light source along an infrared light path, where the infrared light beam includes substantially all wavelengths of radiation within a target range of from about two microns to about three hundred microns, where the infrared light source includes a terahertz supercontinuum source having a titanium:sapphire laser adapted to fire femtosecond laser pulses into a gas cell containing inert gas such as helium, nitrogen, argon, and krypton with optimum maintained gas pressure, through a non-linear optical element. The non-linear optical element produces a second harmonic pulse together with the fundamental, which is necessary to generate broadband supercontinuum terahertz radiation.

Yet another embodiment, for applications where a more restricted range of wavelengths is acceptable, comprises a spectroscopic instrument of the type providing an infrared light beam from an infrared light source along an infrared light path, where the infrared light beam includes substantially all wavelengths of radiation within a target range of from about two microns to about nine microns, where the infrared light source includes a laser that fires laser pulses into a photonic crystal fiber made from chalcogenide glasses, such as glass containing a chalcogenide element as a substantial constituent.

The supercontinuum infrared source described herein provides a very broad spectrum of high intensity infrared radiation within the range of wavelengths desired for integrated circuit applications. Thus, the spectroscopic instruments that use the infrared source can be used on a wide variety of metrology tasks, making them much more useful in the fabrication environment, and also reducing the number and total cost of purchasing and maintaining metrology equipment for the laboratory or fab.

In various embodiments, the infrared light source also includes light emitting diodes that produce radiation within the target range. In some embodiments the infrared light source includes a globar that produces radiation within the target range. The spectroscopic instrument is an infrared reflectometer in some embodiments, and in other embodiments the spectroscopic instrument is an infrared ellipsometer. In some embodiments the spectroscopic instrument is an ellipsometer having within the infrared light path at least one of a rotating (a) polarizer, (b) analyzer, (c) compensator, and (d) waveplate. The spectroscopic instrument of some embodiments is a single channel ellipsometer having within the infrared light path two photoelastic modulators. In alternate embodiments the two photoelastic modulators are operated synchronously or asynchronously. In another embodiment the spectroscopic instrument is a dual channel ellipsometer having within the infrared light path only one photoelastic modulator. In any of the aforementioned embodiments, the spectroscopic instrument may include a Fourier Transform spectrometer.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The various embodiments of the mid-infrared source as described in this disclosure differs from the prior art in that they use several new approaches to generate high intensity broadband radiation in the infrared range.

General Embodiments

Figure 5:
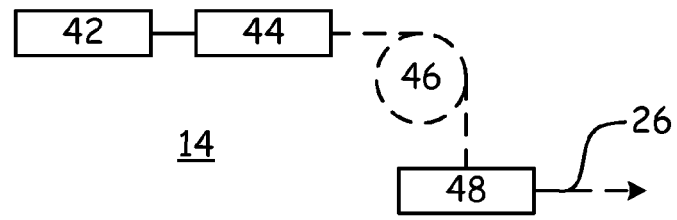
FIG. 5 depicts a functional block diagram of a mid-infrared supercontinuum source according to an embodiment of the present invention.

The first embodiment of a source 14, as depicted in FIG. 5, uses a single wavelength infrared laser (such as a $CO_2$ laser) as a pumping laser 42 that is coupled via optics 44 to a nonlinear, solid core, photonic crystal fiber 46, such as one made from mid-infrared transmitting materials like $AlCl_x Br_{(1-x)}$, NaCl, and ZnSe. By launching high power fs, ps, or ns laser pulses at a pumping wavelength in the mid-infrared band into this class of fiber 46, an intense broadband light source is expelled into the coupling optics 48 and delivered as a supercontinuum beam 26.

The waveguide propagation and dispersion properties (specifically the band gap) of the photonic crystal 46, and its relationship to geometric dimensions such as the solid-core diameter and its surrounding air hole size and pitch, can be designed by numerically solving Maxwell's equations. These properties can be tailored to meet the specifications of supercontinuum source generation in the mid-infrared range.

This supercontinuum source generator has several advantages over the prior art for integrated circuit metrology. Specifically, by coupling a mid-infrared laser 42 to a more infrared-efficient, non-chalcogenide photonic crystal fiber 46, the supercontinuum spectrum is moved further into the mid-infrared spectral region where the intensity of blackbody radiation is relatively weak. In addition, the fiber 46 is optimized for low optical loss within a range of from about two microns to about twenty-seven microns, while the transmittance region of the chalcogenide photonic crystal fiber is much more narrow in the mid-infrared region (from about 2.5 microns to about eleven microns for the material itself), which makes optical loss much larger and the desired intensities possibly unreachable in the spectral regions of critical importance for some integrated circuit metrology applications.

Figure 6:
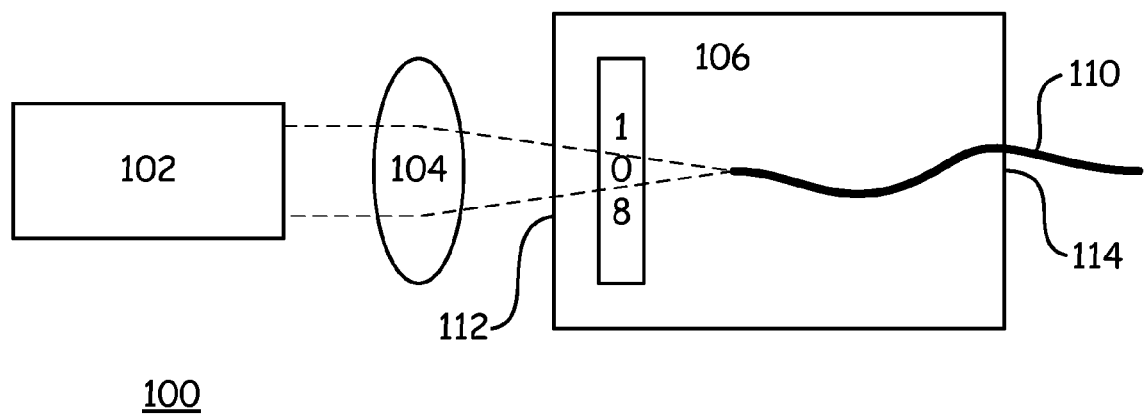
FIG. 6 depicts a functional block diagram of a terahertz supercontinuum source that covers both far- and mid-infrared that can be incorporated into an embodiment of the present invention.

FIG. 6 depicts an alternate supercontinuum source 100 that may be used in a second embodiment. Femtosecond laser pulses from a titanium-sapphire laser 102 are directed through focusing elements 104 and a non-linear optical element 108 to a gas cell 106 filled with an inert gas or inert gas mixtures. The laser pulses hitting the inert gas through an entrance window 112 generate broadband mid- and near-infrared radiation 110 that exits through a window 114 into the metrology system (not depicted).

A third embodiment uses a blackbody source in combination with the supercontinuum source of the first embodiment.

A fourth embodiment covers the spectral region of interest by combining multiple mid-infrared light emitting diodes, in a wavelength range of from about two and a half microns to about eight microns (a wave number range of from about 4000 to about 1250 reciprocal centimeters), for example. This spectral region covers most of the wavelengths within the range of interest for integrated circuit metrology applications.

A fifth embodiment combines the first and second approaches. Stimulated Raman Scattering is the leading mechanism that limits the shortest wavelength end of the spectrum in a supercontinuum source. Specifically, the Raman scattering from laser excitation produces several orders of Stokes lines at $\lambda > \lambda_{pump}$ and anti-Stokes lines at $\lambda < \lambda_{pump}$. The relative scattering intensity of anti-Stokes lines with respect to the incident excitation is much weaker than that of the Stokes lines. This intensity decrease and spectral limitation can be compensated for by selecting mid-infrared light emitting diodes that couple with the spectral output of the supercontinuum source.

Specific Embodiments

The new bright sources described in the section above are readily implemented in infrared ellipsometry and reflectometry instruments, such as by replacing a conventional globar blackbody source with the new bright source. Several specific embodiments of this are provided below.

Figure 1:
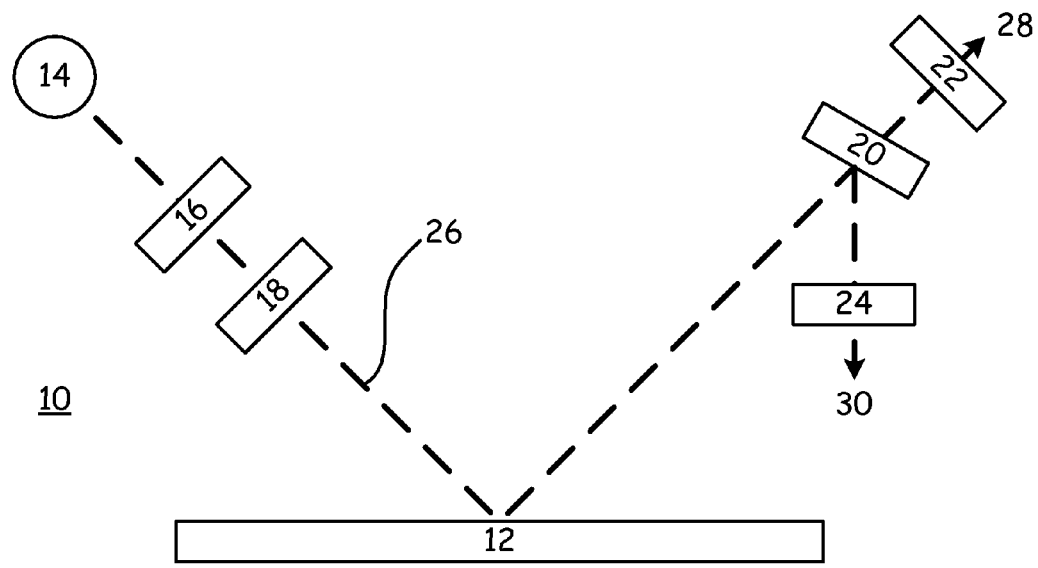
FIG. 1 depicts a functional block diagram of a dual-channel, single photoelastic modulator Fourier Transform Infrared Ellipsometer according to an embodiment of the present invention.

FIG. 1 depicts a functional block diagram of a dual-channel, single photoelastic modulator Fourier Transform Infrared Ellipsometer according to an embodiment of the present invention, where one of the light sources described in the general embodiment section above is used as source 14. The radiation 26 passes through a fixed polarizer 16 and a photoelastic modulator 18 before reflecting off of the substrate 12, such as a semiconducting substrate with one or more layer of material formed on the surface thereof, and which may have structures formed therein. The reflected beam 26 is divided by a beam splitter 20, with a portion of the beam 26 passing through a first fixed analyzer 22 on its way to a first detector 28, and another portion of the beam 26 passing through a second fixed analyzer 24 on its way to a second detector 30.

Figure 2:
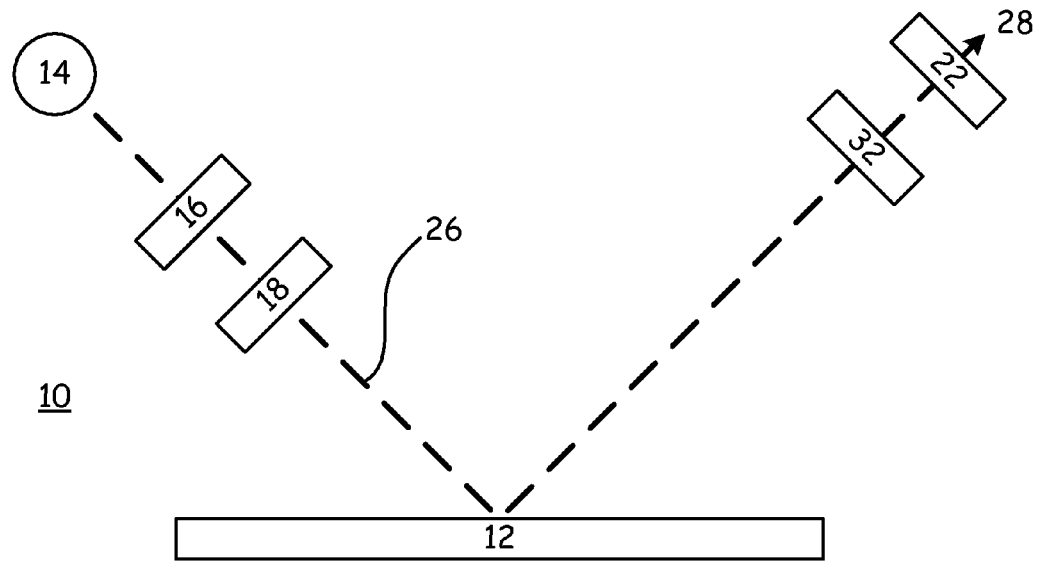
FIG. 2 depicts a functional block diagram of a single-channel, dual photoelastic modulator Fourier Transform Infrared Ellipsometer according to an embodiment of the present invention.

FIG. 2 depicts a functional block diagram of a single-channel, dual photoelastic modulator Fourier Transform Infrared Ellipsometer according to an embodiment of the present invention, where one of the light sources described in the general embodiment section above is used as source 14. The radiation 26 passes through a fixed polarizer 16 and a photoelastic modulator 18 before reflecting off of the substrate 12, such as a semiconducting substrate with one or more layer of material formed on the surface thereof, and which may have structures formed therein. The reflected beam 26 passes through a second photoelastic modulator 32 and a first fixed analyzer 22 on its way to a first detector 28.

Figure 3:
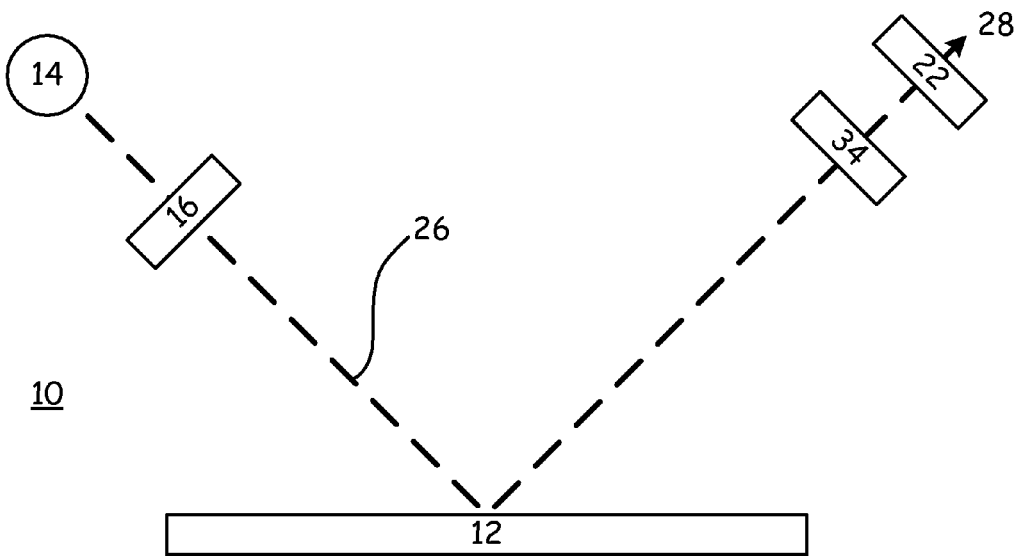
FIG. 3 depicts a functional block diagram of a single-channel, rotating waveplate Fourier Transform Infrared Ellipsometer according to an embodiment of the present invention.

FIG. 3 depicts a functional block diagram of a single-channel, rotating waveplate Fourier Transform Infrared Ellipsometer according to an embodiment of the present invention, where one of the four light sources described in the general embodiment section above is used as source 14. The radiation 26 passes through a fixed polarizer 16 before reflecting off of the substrate 12, such as a semiconducting substrate with one or more layer of material formed on the surface thereof, and which may have structures formed therein. The reflected beam 26 passes through a rotating waveplate 34 and a first fixed analyzer 22 on its way to a first detector 28.

Figure 4:
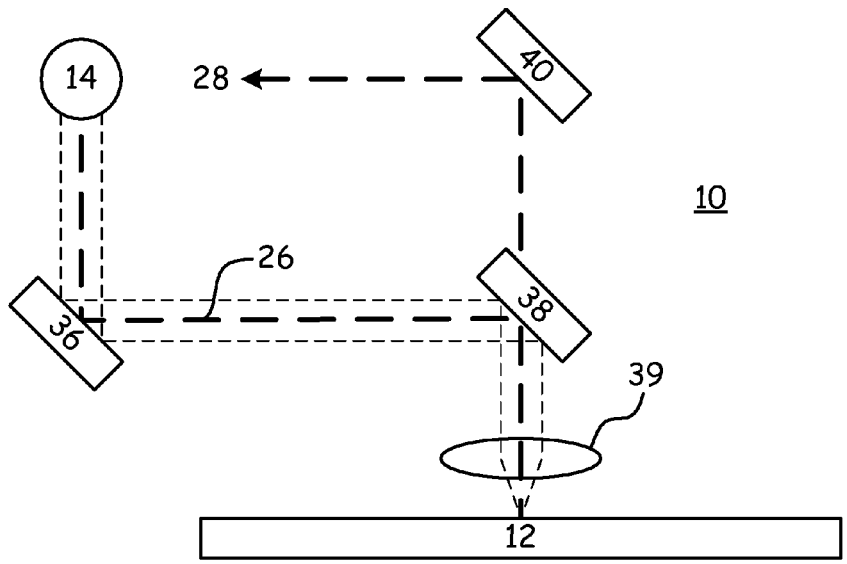
FIG. 4 depicts a functional block diagram of a Fourier Transform Infrared Reflectometer according to an embodiment of the present invention.

FIG. 4 depicts a functional block diagram of a Fourier Transform Infrared Reflectometer according to an embodiment of the present invention, where one of the five light sources described in the general embodiment section above is used as source 14. The radiation 26 is redirected by a mirror 36 and a beam splitter 38 and is focused through an element 39 before reflecting off of the substrate 12, such as a semiconducting substrate with one or more layer of material formed on the surface thereof, and which may have structures formed therein. The reflected beam 26 passes back through the focusing element 39 and the beam splitter 38, and is redirected by a mirror 40 on its way to a first detector 28.

The throughput of a photoelastic modulator based ellipsometer, such as those described above, is only limited by the scanning speed of the interferometer, instead of by a much slower angular frequency of the rotating polarizer, rotating analyzer, or rotating compensator of a standard ellipsometer, where the relatively slow speed is imposed by the synchronization requirements between the rotating components and the interferometer.

Furthermore, the various embodiments of the present invention provide an option for using fixed polarizers and analyzers, removing any need for a wire grid polarizer, which is notorious for its low polarization attenuation ratio in the mid-infrared wavelength regions. As a result, the synchronization between the polarizer, analyzer, or compensator and the interferometer is less relevant, and continuous measurements are made possible.

In addition, the source 14 in combination with a novel infrared-ellipsometry design or an infrared-reflectometry design as disclosed herein enables these devices to achieve a relatively high sensitivity, broad spectral range, and higher signal to noise ratio while using a relatively shorter data acquisition time—all of which is desirable for implementing infrared-ellipsometers and infrared-reflectometers in integrated circuit metrology.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. In a spectroscopic instrument of the type providing an infrared light beam from an infrared light source along an infrared light path, where the infrared light beam includes substantially all wavelengths of radiation within a target range of from about two microns to about twenty-seven microns, the improvement comprising the infrared light source including a supercontinuum source having a single wavelength pumping laser adapted to fire into a solid-core photonic crystal fiber formed at least in part of at least one of $AlCl_xBr_{(1-x)}$ and NaCl, which solid-core photonic crystal fiber produces the infrared light beam when excited by the pumping laser.

2. The spectroscopic instrument of claim 1, wherein the infrared light source further includes light emitting diodes that produce radiation within the target range.

3. The spectroscopic instrument of claim 1, wherein the infrared light source further includes a globar that produces radiation within the target range.

4. The spectroscopic instrument of claim 1, wherein the spectroscopic instrument is a Fourier transform infrared reflectometer.

5. The spectroscopic instrument of claim 1, wherein the spectroscopic instrument is a Fourier transform infrared ellipsometer.

6. The spectroscopic instrument of claim 1, wherein the spectroscopic instrument is an ellipsometer having within the infrared light path at least one of a rotating (a) polarizer, (b) analyzer, (c) compensator, and (d) waveplate.

7. The spectroscopic instrument of claim 1, wherein the spectroscopic instrument is a single channel ellipsometer having within the infrared light path two photoelastic modulators.

8. The spectroscopic instrument of claim 7, wherein the two photoelastic modulators are operated synchronously.

9. The spectroscopic instrument of claim 7, wherein the two photoelastic modulators are operated asynchronously.

10. The spectroscopic instrument of claim 1, wherein the spectroscopic instrument is a dual channel ellipsometer having within the infrared light path only one photoelastic modulator.

11. In a Fourier transform infrared reflectometer of the type providing an infrared light beam from an infrared light source along an infrared light path, where the infrared light beam includes substantially all wavelengths of radiation within a target range of from about two microns to about three hundred microns, the improvement comprising the infrared light source including (1) a globar that produces radiation within the target range, and (2) a supercontinuum source having a $CO_2$ pumping laser adapted to fire into a solid-core photonic crystal fiber formed at least in part of at least one of $AlCl_xBr_{(1-x)}$ and NaCl, which solid-core photonic crystal fiber produces radiation within the target range when excited by the pumping laser.

12. The reflectometer of claim 11, wherein the infrared light source further includes light emitting diodes that produce radiation within the target range.

13. In a Fourier transform infrared ellipsometer of the type providing an infrared light beam from an infrared light source along an infrared light path, where the infrared light beam includes substantially all wavelengths of radiation within a target range of from about two microns to about three hundred microns, the improvement comprising the infrared light source including (1) light emitting diodes that produce radiation within the target range, and (2) a supercontinuum source having a single wavelength pumping laser adapted to fire into a solid-core photonic crystal fiber formed at least in part of at least one of $AlCl_xBr_{(1-x)}$ and NaCl, which solid-core photonic crystal fiber produces radiation within the target range when excited by the pumping laser.

14. The ellipsometer of claim 13, wherein the infrared light source further includes a globar that produces radiation within the target range.

15. The ellipsometer of claim 13, wherein the ellipsometer includes within the infrared light beam path at least one of a rotating (a) polarizer, (b) analyzer, (c) compensator, and (d) waveplate.

16. The ellipsometer of claim 13, wherein the ellipsometer is a single channel ellipsometer having two photoelastic modulators within the infrared light path.

17. The ellipsometer of claim 16, wherein the two photoelastic modulators are operated synchronously.

18. The ellipsometer of claim 16, wherein the two photoelastic modulators are operated asynchronously.

19. The ellipsometer of claim 13, wherein the ellipsometer is a dual channel ellipsometer having only one photoelastic modulator within the infrared light path.

20. In a spectroscopic instrument of the type providing an infrared light beam from an infrared light source along an infrared light path, where the infrared light beam includes substantially all wavelengths of radiation within a target range of from about two microns to about twenty-seven microns, the improvement comprising the infrared light source including a terahertz supercontinuum source having a titanium:sapphire laser adapted to fire femtosecond laser pulses through a non-linear optical element disposed in a gas cell containing an inert gas, the non-linear optical element thereby producing a second harmonic pulse and generating broadband supercontinuum terahertz radiation.

* * * * *